(No Model.)
J. LEININGER.
HARNESS SUPPORT.
No. 479,947. Patented Aug. 2, 1892.
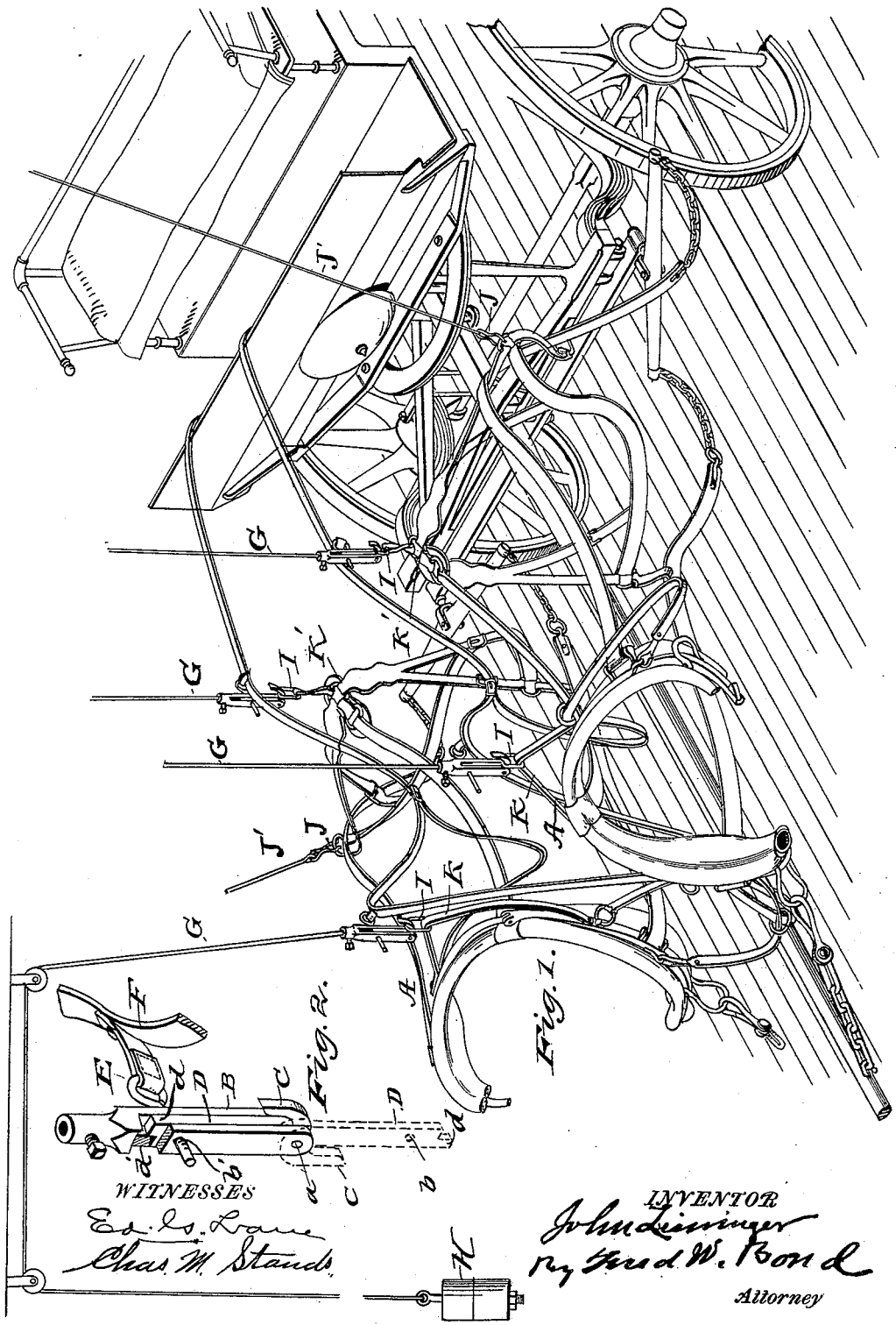

UNITED STATES PATENT OFFICE.

JOHN LEININGER, OF CANTON, OHIO.

HARNESS-SUPPORT.

SPECIFICATION forming part of Letters Patent No. 479,947, dated August 2, 1892.

Application filed October 17, 1891. Serial No. 409,083. (No model.)

*To all whom it may concern:*

Be it known that I, JOHN LEININGER, a citizen of the United States, residing at Canton, in the county of Stark and State of Ohio, have invented certain new and useful Improvements in Detachable Swinging Harness; and I do hereby declare that the following is a full, clear, and exact description of the same, reference being had to the annexed drawings, making a part of this specification, and to the letters of reference marked thereon, in which—

Figure 1 is a perspective view showing a set of harness properly suspended and in position to be attached to a team of horses. Fig. 2 is a detached view of one of the retaining-hooks and its head.

The present invention has relation to detachable swinging harness designed and calculated to be used for fire-engines and like vehicles; and it consists in the novel construction and arrangement hereinafter described, and particularly pointed out in the claim.

Similar letters of reference indicate corresponding parts in each figure of the drawings.

In the accompanying drawings, A represents the harness, which is constructed in the ordinary manner, reference being had to harness designed to be used for fire departments. In the drawings two harnesses are shown suspended; but it will be understood that my invention can be applied to a single harness equally as well. The head B is substantially of the form shown in Fig. 2 and is provided with the pivoted hook C, which hook is pivoted at its lower portion to the head B by means of the rivet $a$, or its equivalent. The hook C is provided with the arm D, which arm is provided with the aperture $b$, said aperture being so adjusted that it will come in line with the apertures $b'$ when the hook and its arm are placed in the position illustrated in the drawings. For the purpose of forming a stop for the arm D, the extension $d$ is provided, which extension strikes the ledge $d'$ and stops the arm at a point to bring the apertures $b$ and $b'$ in line with each other. For the purpose of holding the hook C and its arm D in the position illustrated in the drawings the pin E is provided, which pin passes through the apertures $b$ and $b'$. To the pin E is attached in any convenient manner one of the lines F. It will be understood that all of the pins used are to be attached to the lines F, so that when the lines are pulled by the driver all of the pins will be detached and release the hooks. To the heads B are attached in any desired manner the cords G, which cords extend up over pulleys and are provided at their opposite ends with the weights H. In use when it is desired to hitch to a fire-engine or like vehicle the horse or horses are brought under the harness in the ordinary manner, at which time the harness is placed in position and the lines F attached to the bit-rings. The driver, taking his seat, pulls upon the lines until the pins E are detached from their apertures, which in turn releases the hooks and frees the harness, by reason of the hooks C and their arms D assuming the position indicated in the dotted lines, Fig. 2. For the purpose of providing a means for attaching the harness proper to the hooks C the rings I are provided, which rings are attached to the front straps or bands K and to the hip-straps K'. For the purpose of holding the sides of the harness the catch-hooks J and the cords J' are provided.

It will be understood that as soon as the hooks C and the arms D are released the heads B, together with their different attachments, will be instantly elevated by means of the weights H, thereby clearing the way for the driver and preventing any accident or injury.

By my peculiar arrangement I am enabled to dispense with all cross-bars and swinging rods.

In the drawings the hooks C are shown turned in the same direction; but it will be understood that it is immaterial in which direction the hooks turn, as the rings I may be placed upon either side of the heads B.

It will be understood that the cords J' should be attached to the ceiling at points, so that when the hooks J are released the hooks will swing outward and clear the vehicle.

Having fully described my invention, what I claim, and desire to secure by Letters Patent, is—

In a harness-support, the combination of the head B, provided with the ledge or stop $d'$, the hook C, provided with the extended arm D, pivotally attached to said head, the apertures $b$ and $b'$, the detachable pin E, and means for supporting said head, substantially as and for the purpose set forth.

In testimony that I claim the above I have hereunto subscribed my name in the presence of two witnesses.

JOHN LEININGER.

Witnesses:
E. A. C. SMITH,
F. W. BOND.